United States Patent Office 2,981,124
Patented Apr. 25, 1961

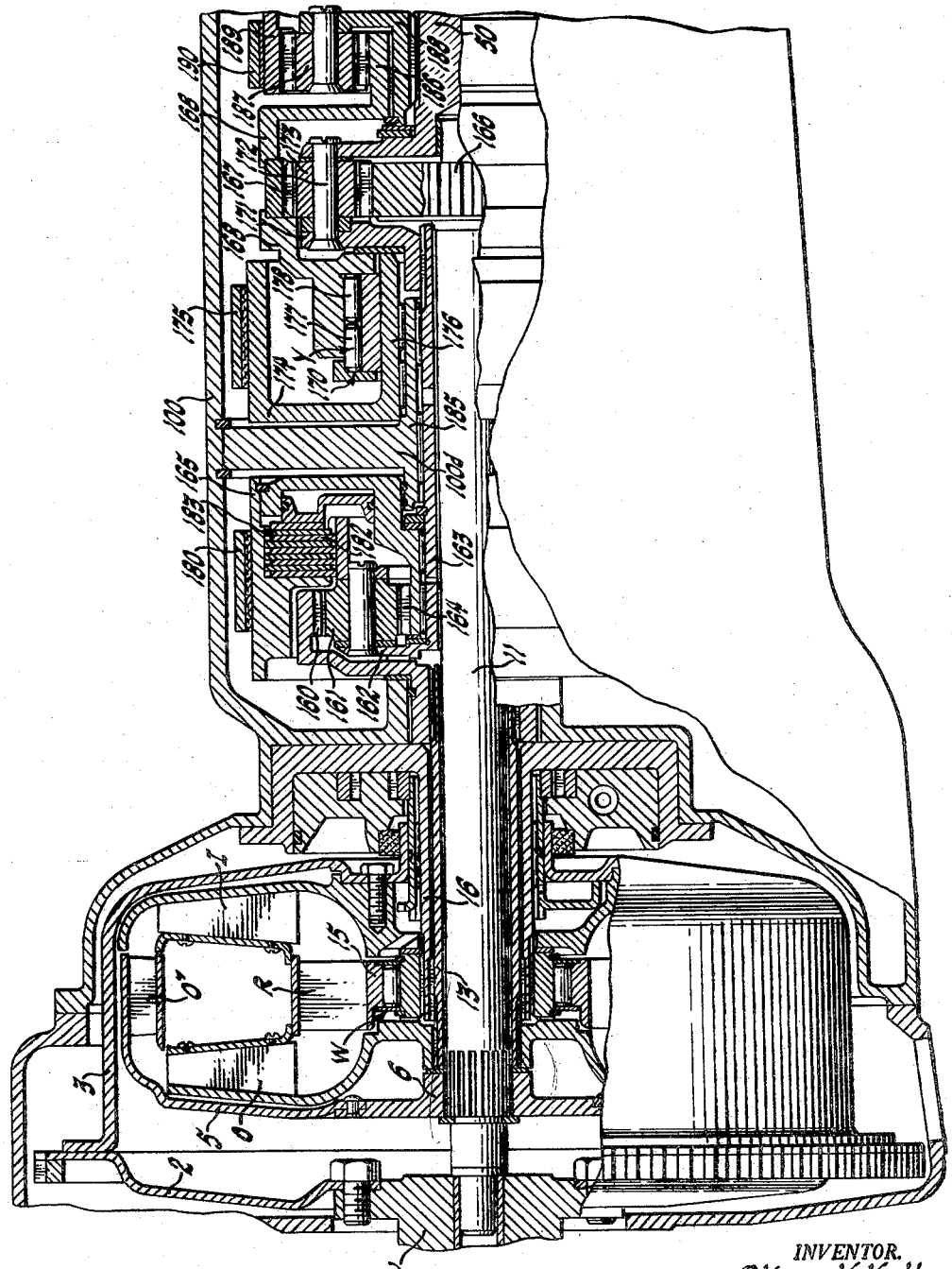
INVENTOR.
Oliver K. Kelley
BY
W. C. Middleton
ATTORNEY

2,981,124

FOUR PHASE CONVERTER DRIVE

Oliver K. Kelley, Bloomfield Hills, Mich., assignor to General Motors Corporation, Detroit, Mich., a corporation of Delaware Application Aug. 5, 1953, Ser. No. 372,564, now Patent No. 2,803,974, dated Aug. 27, 1957, which is a continuation of application Ser. No. 41,767, July 31, 1948. Divided and this application Apr. 25, 1957, Ser. No. 655,041

3 Claims. (Cl. 74—677)

This application is a divisional application of my application S.N. 372,564, filed August 5, 1953, and now Patent No. 2,803,974 which was a continuation of my application S.N. 41,767, filed July 31, 1948, and now abandoned.

The present invention pertains to combined fluid turbine and gear drive mechanisms and in particular to those which embody a fluid torque converter capable of transmitting torque at various speed ratios.

It pertains likewise to such fluid torque converter and gear combinations in which auxiliary turbine output runners are independently connected to separate input gear train elements.

In the present invention, it is the purpose to teach a new principle of torque dividing through multiple fluid torque converter output power members, connected to plural gear train members, the gear train combination serving to recombine the torque components. It has been found that the above principle of operation enables the designer to take advantage of the plural ranges of torque converter output, which when combined with gear train elements, establish what in net effect is a much more efficient and wider over-all, effective speed ratio range, than obtained with other torque converter and gear combinations. It has been found that the invention described herein affords plural drive ranges which merge one into the next, without shock, while maintaining effective acceleration and performance.

The principles involved and the novel and unique advantages in the driving of all types of vehicles will become apparent by the following description when read in the light of the accompanying drawing wherein:

The figure is a sectional arrangement of a torque converter and gear train embodying the invention.

The torque converter shown in the drawing has a single impeller I in the outflow zone, an auxiliary runner O′ adjacent thereto in the outer radial zone, a main runner O in the inflow zone and a single reaction rotor R in the inner radial zone. The engine flywheel 1 is attached to drum 2 connected to the wheel 3 of the impeller I. The runner O′ is attached to drum 5, the hub 6 of which is splined to the intermediate shaft 11. The runner member O is splined to hollow shaft 13. The reaction member R is attached to the outer portion 15 of the one-way brake unit W, the inner portion being fixed to a non-rotating sleeve 16.

The arrangement of the torque converter members is believed novel in that the space locations of the four members have particular bearing of the useful result of the drive. The impeller I lies in the radial outflow zone, the first rotor O′ in the outer radial axial flow zone, the second rotor O in the inflow zone and the reaction member R in the inner radial axial flow zone.

The gear train has two forward drive planetary gear units. The first or front unit has input annulus gear 160 connected to the shaft 13 of the main output rotor O, planet gears 161 journaled on carrier 162 in turn connected to hollow shaft 163 and sun gear 164 connected to reaction drum 165.

The second or rear unit has sun gear 166 mounted on shaft 11 connected to the auxiliary rotor O′, annulus gear 167 attached to drum 168 having roller clutch member 170 formed inside the overhang and carrier 171 supporting the spindles 172 of planet gears 173. The carrier 171 is connected to shaft 163 connected to carrier 162 of the front unit and also to the output shaft 50. Reaction band 175 is adapted to stop drum 174 having an inner axial extension forming the other member 176 for the one-way reaction brake Y. Conventional one-way brake rollers are shown at 177 and 178. Reaction band 180 is adapted to stop drum 165 of the sun gear 164 of the front unit.

The drum 168 is webbed at the right to support sun gear 186 of the reverse unit, the meshing planets 187 being spindled on carrier 188 also attached to output shaft 50. The annulus gear 189 is braked by band 190 for reverse drive.

This gear train is essentially that of Letters Patent 2,430,258, Figure 5, with the coupling clutch for the rear unit omitted, issued to Earl A. Thompson November 4, 1949. The gear train is likewise shown in the Letters Patent of applicant, 2,377,696, Figure 1, issued June 5, 1945.

This arrangement was developed for special purpose drive mechanisms. The brake band 175 and drum 174 may be eliminated, and the hub 176 connected directly to drum 165 of the front gear unit. With this arrangement, the band 180 provides initial drive reaction and is effective during intermediate converter drive, the clutch 182—183 serving to establish the gear-locking-couple across 167—171 for one-to-one gear unit ratio. For reverse, band 190 is applied with band 180 released. The band 175 as shown is available for separate sustaining of the reaction torque assumed by the plural one-way brakes at Y. The novel use of two one-way brakes, phased alike, and in parallel enables the designer to compress a high torque capacity in a small space.

The initial torque of the auxiliary rotor O′ drives shaft 11, applies torque through sun gear 166, and since the one-way roller brake at Y is phased to lock under a backward component, the application of band 175 to drum 174 and band 180 to drum 165 constitutes the master control for initial low range drive.

When the rotor O supersedes rotor O′ in delivering the converter torque, shaft 13 through the reduction of the front unit drives shaft 163, to drive the output shaft 50 through the carrier 171, at which time the one-way reaction brakes at Y release and the rear unit drives at unit speed with shaft 163.

The front unit carrier 162 is extended at the right to form a mounting hub 181 for clutch plates 182 mating with plates 183 carried on inner portion of drum 165, the piston 184 being applied by fluid pressure delivered through appropriate passages leading from non-rotating gland 185 supported by web 100d of casing 100.

The release of band 180 and application of clutch 182, 183 releases the drum 165 and locks the carrier 162 to the sun gear 164, causing the front unit to drive at one-to-one, therefore the converter rotor O may drive shaft 163 at unit speed, and consequently the output shaft 50.

When the converter goes to its top ratio phase with speed increase, and its reaction rotor R ceases to receive a backward component, the drive goes to top ratio.

This arrangement provides the novel overlap of the auxiliary rotor and main rotor phases by virtue of the action of the reaction brakes at Y in permitting automatic locking and release of the annulus gear 167.

The combining ratio effect of locking band 190 on the drum of annulus gear 189 upon the drive, when sun gear 166 alone is driving, is to impart a backward rotation to the shaft 50. However, this effect is only obtained during the interval when the auxiliary rotor O' is transmitting torque since if the rotor O imparts a forward torque component to shaft 13, which could be converted or transmitted by the front unit to shaft 163, the magnitude of the reverse component delivered to the shaft 50 would be diminished. It is normally desirable that band 180 and clutch 182—183 of the front unit be both released for reverse drive, so that rotor O cannot be coupled to load torque. Another consideration is that for reverse drive, drum 168 and sun gear 186 are to be rotated reversely, therefore, the one-way reaction brakes at Y must be free to permit drum 168 to so rotate, requiring band 175 to be released.

The above-noted effect of diminished reverse couple upon rise of rotor torque sufficient to deliver an increasing forward component to the combining gear, is usable where required to limit the speed at which the driver may force his car to reach in reverse. This appears to be a novel and useful principle, in designs of drives developed, for maximum safety factor in operation. It also limits abuse of the mechanism.

It will be evident that the present invention provides an arrangement wherein the auxiliary rotor O' provides initial drive at reduced speed ratio by drive of sun gear 166. As the speed of auxiliary runner O' increases, the torque transmitted thereby decreases and eventually the torque transmitted by runner O will increase to such an extent that the drive of the front unit gears will be such as to cause the one-way brake Y to release the annulus gear 167 and sun gear 166 to rotate as mutual reaction may determine. When runner O assumes the role of major, torque transmitting initial drive can be of a reduction ratio through the front gear unit with such ratio being of higher order than that provided by the rear unit. At some suitable phase of operation of the arrangement, the clutch 182—183 can be applied whereupon the runner O will be transmitting torque to the output shaft at a one-to-one ratio.

I claim:

1. A transmission having an input shaft, an output shaft, and torque transmitting means connecting said shafts, said torque transmitting means including a hydraulic torque converter and a plurality of planetary gear sets, said converter having an impeller element connected to said input shaft and a plurality of relatively rotatable turbine elements, each of said planetary gear sets having a plurality of rotatable members including ring gear, sun gear and planet carrier members, the carriers of each of said gear sets being connected together and to said output shaft, the first of said turbine elements being operably connected with the sun gear of a first of said gear sets, a second of said turbine elements being connected to the ring gear of a second of said gear sets, means for holding the ring gear of said first gear set and the sun gear of said second gear set against reverse rotation for drive of said output shaft at reduction ratios by said turbine elements, and means for compelling the members of said second of said gear sets to rotate in unison for direct drive of said output shaft by said second turbine element.

2. A transmission having an input shaft, an output shaft, and torque transmitting means connecting said shafts, said torque transmitting means including a hydraulic torque converter and a plurality of planetary gear sets, said converter having an impeller element connected to said input shaft and a plurality of relatively rotatable turbine elements, each of said planetary gear sets having a plurality of rotatable members including ring gear, sun gear and planet carrier members, the carriers of each of said gear sets being connected together and to said output shaft, the first of said turbine elements being operably connected with the sun gear of a first of said gear sets, a second of said turbine elements being connected to the ring gear of a second of said gear sets, means for holding the ring gear of said first gear set and the sun gear of said second gear set against reverse rotation for drive of said output shaft at reduction ratios by said turbine elements, means for compelling the members of said second of said gear sets to rotate in unison for direct drive of said output shaft by said second turbine element, and one way drive establishing means in the torque path between said first turbine and said output shaft automatically releasable when said output shaft is driven by said second turbine element faster than it can be driven by said first turbine element.

3. A transmission having an input shaft, an output shaft, and torque transmitting means connecting said shafts, said torque transmitting means including a hydraulic torque converter and a plurality of planetary gear sets, said converter having an impeller element connected to said input shaft and a plurality of relatively rotatable turbine elements, each of said planetary gear sets having a plurality of rotatable members including ring gear, sun gear and planet carrier members, the carriers of each of said gear sets being connected together and to said output shaft, the first of said turbine elements being operably connected with the sun gear of a first of said gear sets, a second of said turbine elements being connected to the ring gear of a second of said gear sets, means for holding the ring gear of said first gear set and the sun gear of said second gear set against reverse rotation for drive of said output shaft at reduction ratios by said turbine elements, and means for compelling the members of said second of said gear sets to rotate in unison for direct drive of said output shaft by said second turbine element, said means for holding the ring gear of said first gear set against reverse rotation including a one way drive establishing device automatically releasable when said output shaft is driven by said second turbine element faster than it can be driven by said first turbine element.

References Cited in the file of this patent

UNITED STATES PATENTS

| | | |
|---|---|---|
| 2,316,390 | Biermann | Apr. 13, 1943 |
| 2,325,876 | Pollard | Aug. 3, 1943 |
| 2,519,022 | Burtnett | Aug. 15, 1950 |
| 2,609,706 | Jandasek | Sept. 9, 1952 |
| 2,695,533 | Pollard | Nov. 30, 1954 |
| 2,803,974 | Kelley | Aug. 27, 1957 |